United States Patent [19]

Loeb

[11] Patent Number: 5,331,908
[45] Date of Patent: Jul. 26, 1994

[54] METHOD OF GROWING PERENNIALS

[75] Inventor: Carl F. Loeb, 1879 Cascade Ridge Dr., Mount Vernon, Wash. 98273

[73] Assignees: Carl F. Loeb; Duane A. Melcher, both of Mount Vernon, Wash.

[21] Appl. No.: 883,105

[22] Filed: May 14, 1992

[51] Int. Cl.⁵ .............................................. A01C 1/00
[52] U.S. Cl. .................................. 111/114; 111/200; 111/900; 47/66; 47/77; 56/1
[58] Field of Search ............... 111/100, 114, 200, 520, 111/919; 56/1, DIG. 2; 47/66, 59, 73, 77, 78; 171/21, 22, 144

[56]  References Cited

U.S. PATENT DOCUMENTS

| | | | |
|---|---|---|---|
| 32,808 | 12/1888 | Wingerden | 47/85 |
| 1,634,727 | 7/1927 | Roy . | |
| 1,959,139 | 5/1934 | Otwell | 47/37 |
| 2,852,889 | 9/1958 | Roy | 111/58 |
| 3,154,884 | 11/1964 | Amar et al. | 47/1 |
| 3,246,615 | 4/1966 | Poll | 111/100 |
| 3,541,979 | 11/1970 | Lorenzen | 56/1 |
| 3,736,889 | 6/1973 | Reid | 111/1 |
| 3,921,548 | 11/1975 | Alkemade | 111/2 |
| 3,965,617 | 6/1976 | Kawase | 47/58 |
| 4,019,276 | 4/1977 | Moorman et al. | 47/66 |
| 4,031,832 | 6/1977 | Edwards | 111/4 |
| 4,111,135 | 9/1978 | Braun et al. | 111/2 |
| 4,115,950 | 9/1978 | Lantai | 47/58 |
| 4,327,538 | 5/1982 | Milhelm et al. | 56/1 |
| 4,357,884 | 11/1982 | Rast, Jr. | 111/2 |
| 4,434,576 | 3/1984 | Sowerwine | 47/66 |
| 4,547,102 | 7/1984 | Ploeger, Jr. | 111/114 |
| 4,939,865 | 7/1990 | Whitcomb et al. | 47/66 |
| 5,007,135 | 4/1991 | Rigsby | 47/66 |
| 5,016,548 | 5/1991 | Ito | 111/114 |
| 5,068,999 | 12/1991 | Visser | 47/73 |
| 5,103,588 | 4/1992 | Reiger | 47/73 |

OTHER PUBLICATIONS

Plantpak, "Grower Products", Nov. 26, 1981.
Timber Trees Grower Handbook, "Hydrangea Production", Bailey, 1989.
"La culture in vitro", Augé, Oct. 1983.
Plant Propagation, Principles on Practice, 2d ed., Hartmann pp. 326–327, 1968.
Commercial Flower Forcing, 7th ed, Laurie, pp. 406–412.
The Ball Red Book, Ball Inc., 1965, pp. 259–260.

Primary Examiner—Randolph A. Reese
Assistant Examiner—Spencer Warnick
Attorney, Agent, or Firm—Joan H. Pauly

[57]  ABSTRACT

A starter plant (10) is planted in soil (17) in a bottomless container (18), which is placed on a support surface (28). The plant is allowed to grow in a controlled environment until a time in its growing season when its root system is sufficiently developed to hold the soil (17) in the container (18) when the container (18) is removed from the surface (28). Then, the plant and the container (18) are planted as a unit in soil (30) in a field. The plant is allowed to grow to full size in the field, where it develops a densely rooted basal plate (32) inside the container (18) and feeder roots (34) that extend below the bottom of the container (18) into the soil (30). The plant is harvested from the field by undercutting the feeder roots (34) and removing the container (18) and the plant as a unit from the soil (30). The foliage (12) may be trimmed to a volume no bigger than the container (18), and the trimmed plant (38) may be stored or shipped.

7 Claims, 3 Drawing Sheets

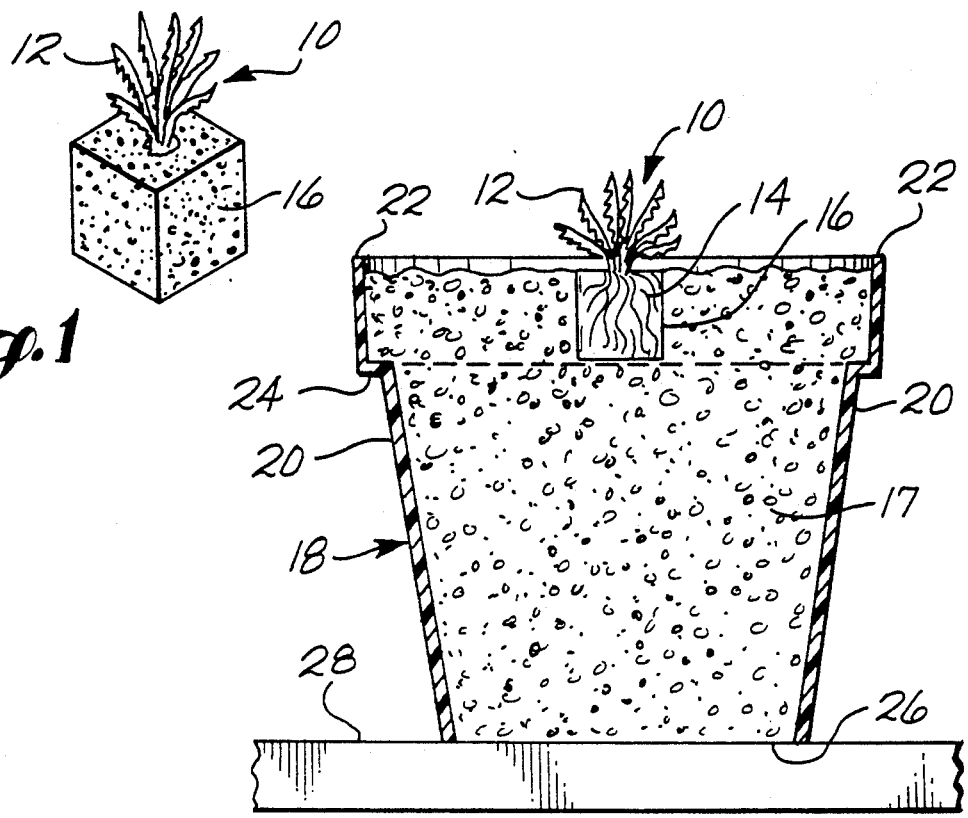
Fig. 1
Fig. 2
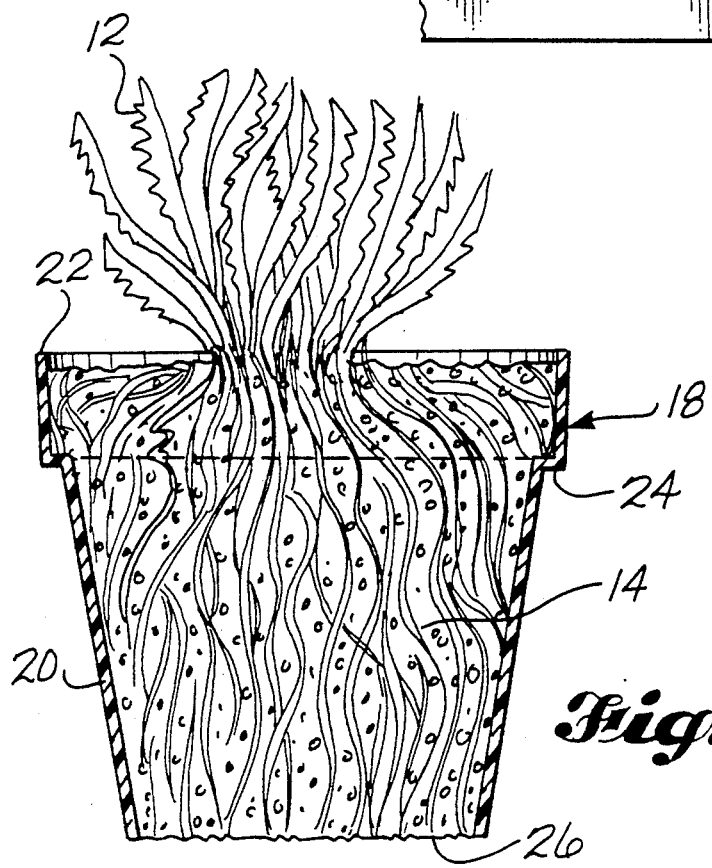
Fig. 3

METHOD OF GROWING PERENNIALS

DESCRIPTION

1. Technical Field

This invention relates to methods of growing plants and, more specifically, to a method of growing perennials in which a starter plant is grown in an open bottom container, the container is planted in a field, growth of the basal plate is confined to the container while the plant is growing in the field, and feeder roots are undercut during harvesting.

2. Background Information

The "basal plate" of a plant is the portion of the plant where differentiation between what is root and what is leaf or stem takes place. A perennial has a durable basal plate that is capable of regrowing a fully developed plant following a period of dormancy that may include the top portion of the plant dying back to the ground. Perennial basal plates include specialized or modified stems, such as rhizomes, runners, tubers, corms, bulbs, bulbils, and similar root systems that can be used to propagate the plants.

The invention addresses the limitations of conventional techniques for growing perennials on a commercial scale and problems that have been associated with these techniques. At present, most perennials grown on a commercial scale are shipped to retail nurseries in a bare root form. The typical method for growing the plants includes starting the plants in a greenhouse and then planting them in a field where the roots are free to grow unrestrained in the soil. When the plants have reached full size and are ready to be harvested for shipment, they are dug up from the soil, and the soil is knocked off their roots. Removing the soil from the root system is necessary in order to reduce the considerable weight and bulk of the root ball (the root system and the surrounding soil) resulting from the unrestrained growth of the roots. However, removing the soil has the considerable disadvantage of resulting in significant trauma to the root system and possible damage to the basal plate. In addition, the bare roots are more susceptible to disease and desiccation than roots surrounded by soil would be. If the plants are stored prior to replanting, the roots must be kept moist to prevent the basal plate from drying out. This is commonly done by packing moist peat moss or sawdust around the roots.

The trauma to the roots and/or the basal plate and their exposure to disease and desiccation lead to a higher loss rate of plants during storage, shipping, and subsequent attempts to reestablish the plants. The plants that do survive and become reestablished for ultimate sale are of uneven quality since individual plants suffer differing degrees of trauma. In addition to the problems resulting from trauma, disease, and desiccation, the conventional methods for growing, storing, and shipping perennials have the disadvantages of being relatively labor intensive and time consuming and, therefore, expensive to carry out.

SUMMARY OF THE INVENTION

The subject of the present invention is a method of growing a perennial having a growing season and a dormant season.

According to an aspect of the invention, the method comprises providing a container having an at least substantially continuous sidewall, an open top, and an open bottom. The container is substantially filled with a growing medium. A starter plant is planted in the growing medium in the container. The container is placed in soil in a field with the open top substantially flush with the soil. For a period of time during the growing season, the plant is allowed to grow in the container in the field. Foliage grows above the soil, a densely rooted basal plate forms within the container, and feeder roots grow outwardly from the bottom of the container into soil below the container. Throughout said period of time, growth of the basal plate is confined to the container. The plant is harvested during the dormant season by undercutting the feeder roots and removing the plant and the container as a unit from the field. The steps of planting the starter plant in the growing medium and placing the container in the soil may be carried out in any order or simultaneously.

According to another aspect of the invention, the method comprises planting a starter plant in a growing medium in a container. The container has an at least substantially continuous sidewall, an open top, and an open bottom, and is substantially filled with the growing medium. The container is placed on a support surface. The plant is allowed to grow in the container until a point in its growing season when the roots of the plant are sufficiently developed to hold the growing medium within the container when the plant and the container are removed as a unit from the support surface. Then, the plant and the container as a unit are planted in soil in a field, and the plant is allowed to grow in the field. A densely rooted basal plate is formed within the container, and feeder roots grow outwardly from the bottom of the container into the soil below the container. The plant is harvested during its dormant season by undercutting the feeder roots and removing the plant and container as a unit from the field.

As used herein, the term "perennial" includes herbaceous perennials and various other perennial plants, such as rose bushes and fuchsias. Examples of herbaceous perennials are delphiniums, shasta daisies, astilbes, hostas, phlox, hemerocalis, artemisias, gloriosa daisies, columbines, asters, and hardy ferns. The term "dormant season" is defined as a period in which the plant's growth slows down or ceases. The foliage may wither or die back. The degree to which growth slows depends largely on the particular plant variety and the climate in which the plant is grown.

After the densely rooted basal plate has formed, the foliage may be trimmed. After harvesting and trimming, the plant may be transported in the container and/or stored in the container at about 29° F. In the case of herbaceous perennials, the foliage is preferably trimmed to a volume no greater than about the volume of the container. It is usually preferable to leave other types of perennials with a somewhat larger top portion.

According to still another aspect of the invention, a starter plant is planted in a container, as described above. The plant is allowed to grow in the container in a controlled environment until a point in the plant's growing season when the plant is sufficiently hardy to be planted, and grow to full size, in a field. Then, the plant and the container as a unit are planted in soil in a field, and the plant is allowed to grow in the field. A densely rooted basal plate forms in the container, and feeder roots grow outwardly from the bottom of the container into the soil below the container. The plant is harvested as described above. The plant may also be trimmed and transported and/or stored as described above.

The critical portions of a perennial necessary to allow the plant to reestablish itself following harvesting include the basal plate and the roots in and around the basal plate that are needed to prevent desiccation of the basal plate. The method of the invention minimizes trauma to the critical portions of the plant during the various growing stages, harvesting, and subsequent storage and transport. The method also protects these portions of the plant against disease and desiccation. The avoidance of trauma, disease, and desiccation reduces the loss rate of plants to a minimum and significantly increases the plants' recovery rate following shipment. It also results in plants that are of consistent high quality when they reach the ultimate purchaser and quickly become well-established in their permanent locations.

The method of the invention is also less work intensive and time consuming and, thus, less expensive to carry out than conventional methods. Containing a portion of the root system throughout the period in which the plant is growing in a field confines the critical portions of the plant to the relatively small area within the container. At the same time, normal development of a large field-grown feeder root system out through the bottom of the container results in a plant with extremely high carbohydrate reserves within its basal plate. The concentration of the critical portions in the container permits the feeder roots below the container to be pruned during harvesting and makes mechanical harvesting possible without damage to the plant. Following harvesting, the soil inside the container provides sufficient moisture to the roots in the container to prevent desiccation of the basal plate. Therefore, there is no need for packing in moist peat moss or sawdust. All of these factors, plus the compact configuration of the harvested and trimmed plants, provide savings during storage and shipping since the plants require less space and less special handling than bare root plants.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of a starter plant for use in the present invention;

FIG. 2 is a sectional view of the starter plant in a container resting on a support surface;

FIG. 3 is a sectional view of the container and the plant following a period of growth in a controlled environment;

BEST MODE FOR CARRYING OUT THE INVENTION

Figure 4:
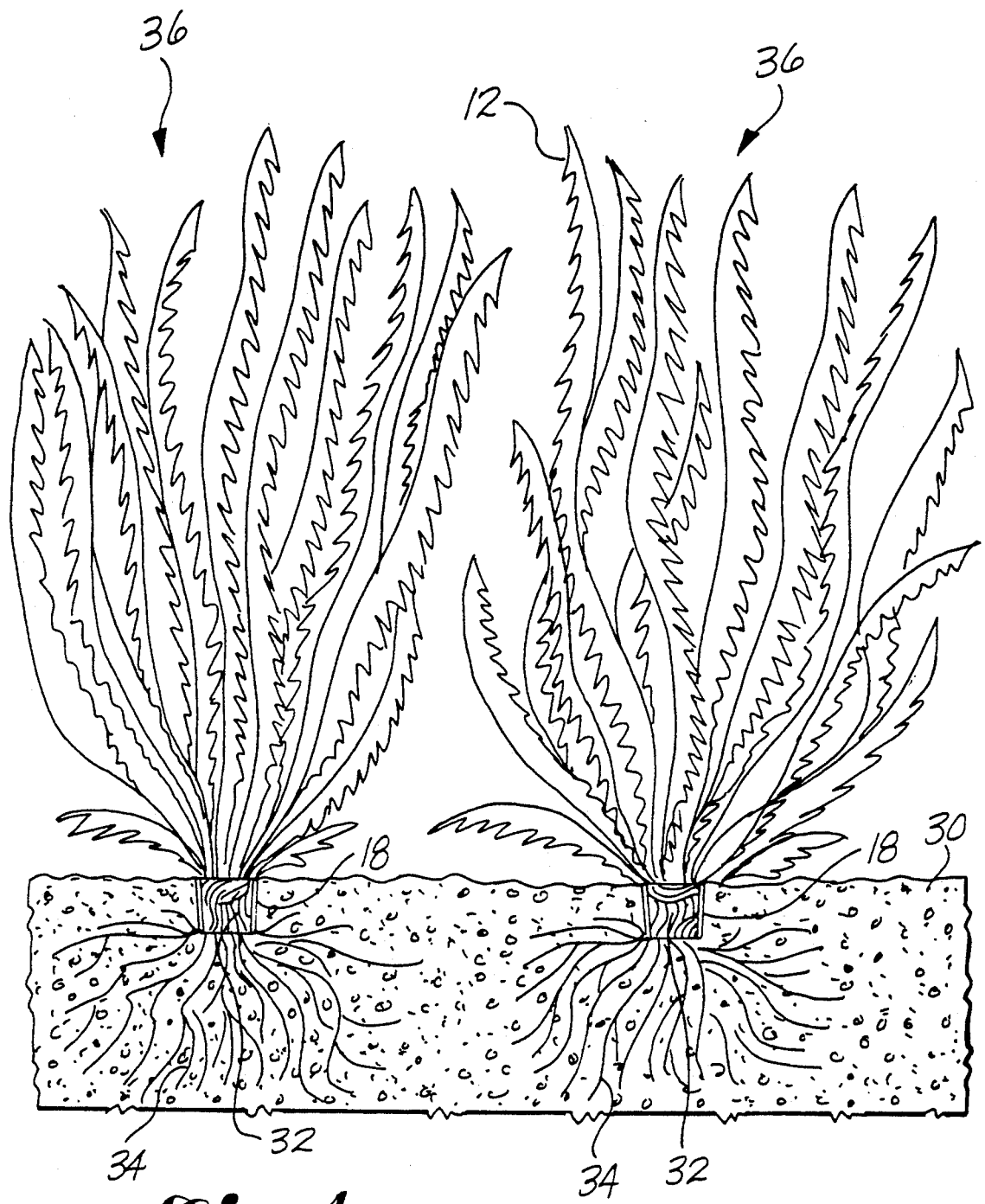
FIG. 4 is a sectional view of two full-grown plants in their containers in a field.

The drawings illustrate the best mode for carrying out the invention currently known to the applicant. The plant shown in the drawings is a shasta daisy. This type of plant is a typical example of a plant that may be advantageously grown using the method of the invention. It is of course to be understood that the method of the invention may also be used to advantage to grow other types of plants, including, but not limited to, those listed above.

The first step of the method of the invention is growing a starter plant. This step may be carried out in a conventional manner. The plant may be started by germinating a seed or rooting a cutting in a block of plug mix, such as a half-inch cube 16 shown in FIGS. 1 and 2.

When the foliage 12 and roots 14 of the starter plant 10 have reached the stage of growth illustrated in FIGS. 1 and 2, the plant 10 is planted in a suitable growing medium 17 in a container 18, as illustrated in FIG. 2. The container 18 may vary in size but preferably is about the size of a conventional three-inch pot. The container 18 has a continuous sidewall 20, an open top defined by a rim 22, and an open bottom 26. The sidewall 20 has a conventional tapered shape with a step 24 formed near the rim 22. The container 18 is preferably substantially filled with the growing medium 17. As shown in FIG. 2, the medium 17 fills the container 18 to a level close to the top rim 22.

The container 18 is placed on a support surface 28, which may be provided by a plant tray or other convenient structure. The placing of the container 18 on the surface 28 is preferably carried out before the container 18 is filled with the growing medium 17 and the starter plant 10 is planted therein. This is the easiest way to avoid loss of the growing medium 17 out through the open bottom 26 of the container 18. After the plant 10 has been planted in the container 18, the plant is allowed to grow in the container 18 in a controlled environment, such as a greenhouse.

When the plant has grown sufficiently in the greenhouse, it is moved outdoors and planted in a field. This is done during the plant's growing season. Various criteria may be used to determine the exact timing of the moving of the plant to the field. Preferably, the plant is not moved to the field until its roots 14 are sufficiently developed to hold the growing medium 17 within the container 18 when the plant and the container 18 are removed as a unit from the support surface 28. This stage of the plant's growth is illustrated in FIG. 3. At this stage, the basal plate is in a rudimentary state of development. Another criterion for moving the plant is that it has grown sufficiently so that, at the point in its growing season when it is to be moved, it is sufficiently hardy to be planted, and grow to full size, in the outdoor environment of a field. The plant is planted in the soil 30 in the field without removing it from the container 18. In other words, the plant and the container 18 are planted as a unit. This unit is positioned so that the top rim 22 of the container 18 is about even with the soil level, as illustrated in FIG. 4.

During the remainder of its growing season, the plant grows in the field and develops into a full-size plant 36. FIG. 4 illustrates two fully grown shasta daisies in a field at or near the end of their growing season. As each plant is growing in the field, a densely rooted basal plate 32 forms within the container 18, and feeder roots 34 grow outwardly and downwardly from the bottom 26 of the container 18 into the soil 30 below the container 18. The plant's foliage 12 grows upwardly and outwardly from the container 18 in essentially the same manner as the foliage of a similar plant with roots unrestrained by a container would grow. The basal plate 32, which stores the energy for the regrowth of the plant following harvesting and replanting, and the critical portions of the root system remain protected within the container 18. The critical portions of the root system include thick roots 33 that grow out from the basal plate 32 and smaller feeder roots that branch out from the thick roots 33 and collect moisture. The basal plate 32 is referred to herein as "densely rooted" because of the dense formation of the portions of the root system inside the container 18. The dense growth of these roots can best be seen in FIG. 5. The feeder roots 34 extend downwardly into the soil 30 to obtain moisture for the plant. The feeder roots 34 can be trimmed during harvesting without any appreciable effect on the plant's regrowth.

Figure 5:
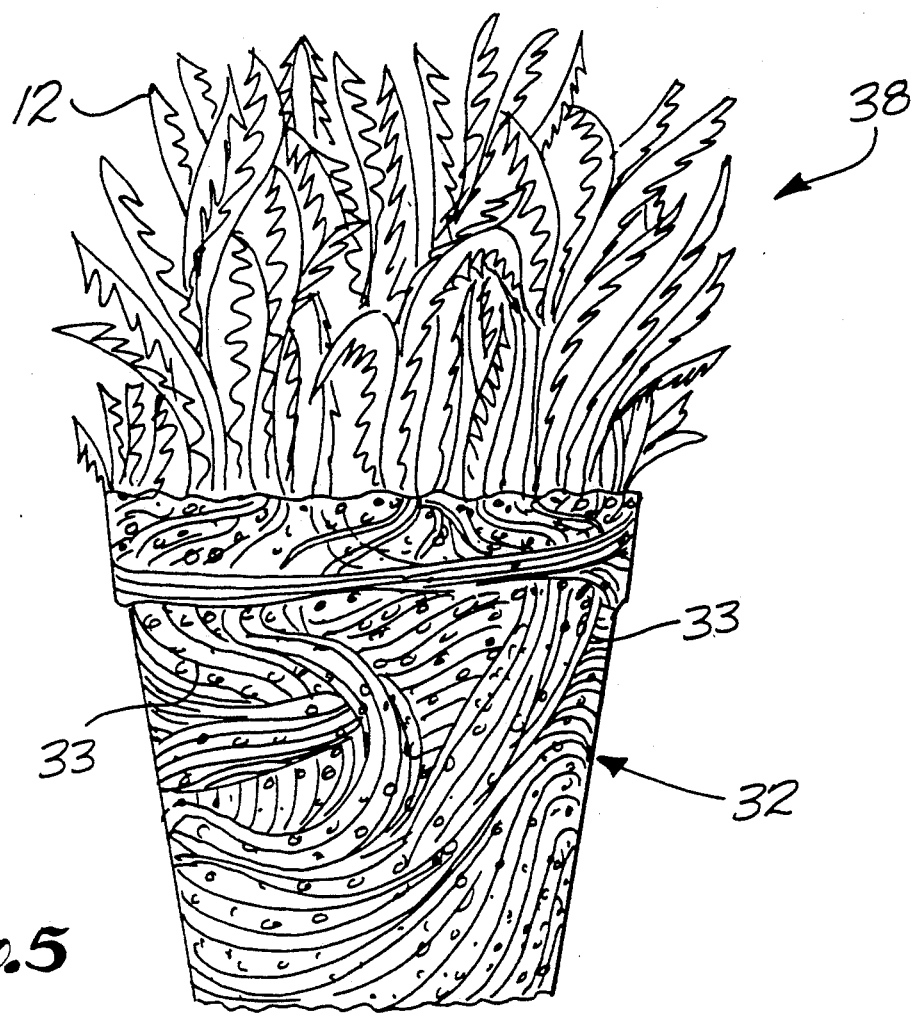
FIG. 5 is an elevational view of one of the full-grown plants following harvesting and trimming, with the container omitted.

At the end of its growing season, the plant 36 enters its dormant season, and a portion of its foliage 12 begins to wither and die. The plant is harvested during its dormant season, and the foliage 12 is preferably trimmed back. The foliage 12 may be trimmed shortly before harvesting, during harvesting, or shortly thereafter. The foliage of a herbaceous perennial, like the shasta daisies shown in the drawings, is preferably trimmed so that the volume of the foliage is no greater than the volume of the container 18. In FIG. 5, the harvested and trimmed plant 38 is shown with the container 18 omitted to illustrate the structure of the basal plate and the critical portions of the root system. As can be seen in FIG. 5, some of the thick roots 33 grow in a swirling pattern along the inner surface of the container sidewall.

Figure 6:
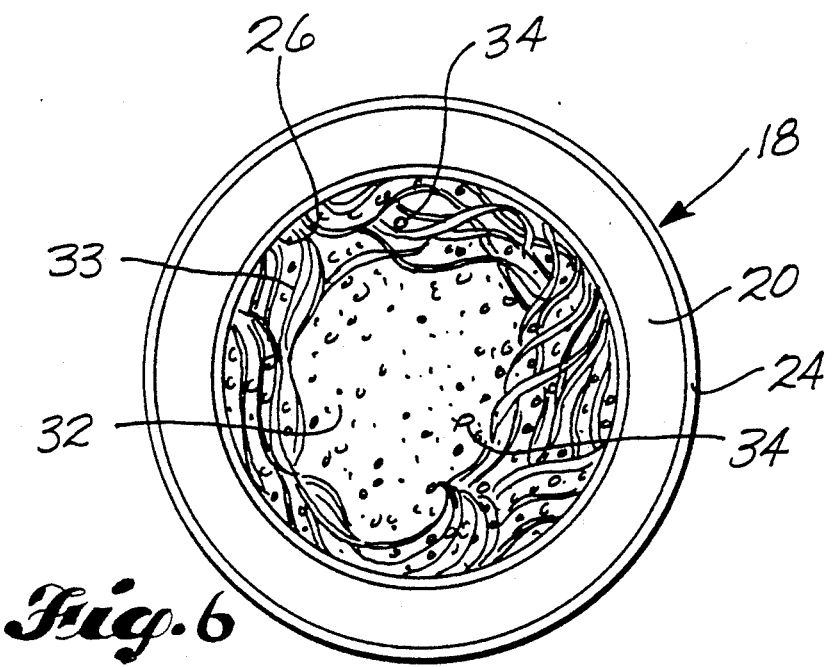
FIG. 6 is a bottom plan view of the plant shown in FIG. 5 in its container.

The plant is harvested by undercutting the feeder roots 34 and lifting the container 18 and the plant as a unit from the soil 30. The feeder roots 34 are cut close to the bottom 26 of the container 18. In FIG. 6, which illustrates the bottom of the plant and container 18 after harvesting, the ends of the severed feeder roots 34 are visible. The harvesting may be performed manually, or a suitable mechanical harvesting device may be used to accomplish all or a portion of the harvesting. The mechanical device may include undercutting tools and/or a mechanism for lifting the container 18 from the soil.

After harvesting and trimming, the plant 38 may be transported without removing it from its container 18. During shipping, the container 18 protects the basal plate 32 and the associated roots from trauma. The plant 38 and the container 18 may also be stored as a unit. During storage, the plant 38 is preferably maintained in its dormant state. In most cases, a storage temperature of about 29° F. is optimal. The storage may be carried out prior to and/or following shipping. During both storage and shipping, the compact size of the trimmed plant 38 and the protection afforded the plant by the container 18 help minimize the space and special handling required by the plant 38 and, thereby, help minimize the cost of storage and shipping.

When it is desired to recommence growth of the plant 38, the plant 38 may be transplanted into a larger container or directly into the ground, for example, in an outdoor flower bed. The plant 38 and the container 18 may be placed in the larger container or the ground as a unit, but the plant 38 is preferably removed from the container 18 and then transplanted into the larger container or the ground. After being transplanted, the plant 38 quickly sends out feeder roots and becomes established. Assuming that the replanting is carried out at an appropriate point in the plant's growing season, the plant recovers easily and grows normally and robustly to its full size. Both the large nutritive reserves in the basal plate 32 and the absence of trauma to the critical portions of the plant contribute to this rapid recovery.

The method described above may be varied in a number of ways without departing from the spirit and scope of the invention. One major variation that may be preferable in some circumstances is to vary the order in which the planting of the starter plant 10 in the container 18 and the placing of the container 18 in the soil in a field are carried out. The container 18 may be placed in the soil 30 prior to the planting of the starter plant 10 in the container 18. The container 18 is placed in the soil 30 with its top rim 22 substantially flush with the soil 30. The filling of the container 18 with a growing medium 17 may be carried out before, after, or at the same time as placing the container 18 in the soil 30. The starter plant 10 may be planted in the growing medium 17 when the filling of the container 18 is being completed or later as a separate step. Once the starter plant 10 has been planted in the container 18 in the field, the remaining portions of the method are carried out substantially as described above. The only major difference would be that the plant might require some protection during the early stages of its growth in the field. In such case, the plant could be protected by the known technique of placing a tent over the plant. Regardless of whether the plant and container 18 are placed in the field as a unit or the container 18 is positioned prior to planting the plant, and regardless of the exact timing of moving the plant to the field, throughout the period of time in which the plant is growing in the field, growth of its basal plate 32 is confined to the container 18. This results in the protection to the plant and the advantageous growth characteristics described above.

As illustrated, the container 18 has a continuous integral sidewall 20 and a fully open bottom 26. The bottom of a container used to practice the invention should be sufficiently open to permit sufficient feeder root growth out of the bottom and into the soil to collect the water needed by the plant. The container 18 may be shaped in various configurations without departing from the spirit and scope of the invention. For example, the container 18 may have a square, rather than a circular, cross section and/or a straight, rather than a tapered, sidewall. Whatever the configuration of the container, the sidewall should be at least substantially continuous to prevent the growth of any roots out through the sidewall. The container may be made from various materials. One example is polystyrene. The material is preferably chosen to give the container sufficient strength and flexibility so that it will not crack or disintegrate during the various stages of its use.

As noted above, the method of the invention may be used for growing herbaceous perennials, such as delphiniums, shasta daisies, astilbes, hostas, phlox, hemerocalis, artemisias, gloriosa daisies, columbines, and asters. The growing schedules for these ten types of perennials are all very similar. A typical schedule for growing these perennials in the northwestern coastal region of Washington state, U.S.A., is set forth below.

When the plants are started from seeds, the seeds are sewn on about April 1. When the plants are grown from cuttings, the cuttings are taken about three weeks earlier. Following the sprouting of the seeds or the rooting of the cuttings, the seedlings or rooted cuttings are handled in the same manner. In about mid to late May, the seedlings or cuttings are planted in the bottomless containers. In mid July, the plants are moved out of the greenhouse and planted in a field. Harvesting occurs between about November 1 to March 1.

Although the preferred embodiment of the invention has been illustrated and described herein, it is intended to be understood by those skilled in the art that various modifications and omissions in form and detail may be made without departing from the spirit and scope of the invention as defined in the following claims.

What is claimed is:

1. A method of growing a perennial having a growing season and a dormant season, said method comprising:
   providing a container having an at least substantially continuous sidewall, an open top, and an open bottom; and substantially filling said container with a growing medium;
   planting a perennial starter plant in said growing medium, and placing said container on a support surface;
   allowing said plant to grow in said container until a point in said growing season when roots of said plant are sufficiently developed to hold said growing medium within said container when said plant and said container are removed as a unit from said surface;
   then, during said growing season, planting said plant and said container as a unit in soil in a field;
   allowing said plant to grow in said field, including allowing foliage to grow above said soil, a densely rooted basal plate to form within said container, and feeder roots to grow outwardly from the bottom of said container into soil below said container; and
   harvesting said plant during the dormant season by undercutting said feeder roots and removing said plant and said container as a unit from said field.

2. The method of claim 1, comprising, after allowing said plant to form said densely rooted basal plate, trimming said foliage to a volume no greater than about the volume of said container; and, after harvesting said plant and trimming said foliage, transporting said plant in said container.

3. The method of claim 1, comprising, after allowing said plant to form said densely rooted basal plate, trimming said foliage to a volume no greater than about the volume of said container; and, after harvesting said plant and trimming said foliage, storing said plant in said container at about 29° F.

4. A method of growing a perennial having a growing season and a dormant season, comprising:
   providing a container having an at least substantially continuous sidewall, an open top, and an open bottom; and substantially filling said container with a growing medium;
   planting a perennial starter plant in said growing medium;
   allowing said plant to grow in said container in a controlled environment until a point in said growing season at which said plant is sufficiently hardy to be planted, and grow to full size, in a field;
   then, during said growing season, planting said plant and said container as a unit in soil in a field;
   allowing said plant to grow in said field, including allowing foliage to grow above said soil, a densely rooted basal plate to form within said container, and feeder roots to grow outwardly from the bottom of said container into soil below said container; and
   harvesting said plant during the dormant season by undercutting said feeder roots and removing said plant and said container as a unit from said field.

5. The method of claim 4, comprising, after allowing said plant to form said densely rooted basal plate, trimming said foliage to a volume no greater than about the volume of said container; and, after harvesting said plant and trimming said foliage, transporting said plant in said container.

6. The method of claim 4, comprising, after allowing said plant to form said densely rooted basal plate, trimming said foliage to a volume no greater than about the volume of said container; and, after harvesting said plant and trimming said foliage, storing said plant in said container at about 29° F.

7. A method of growing a perennial having a growing season and a dormant season, comprising:
   providing a container having an at least substantially continuous sidewall, an open top, and an open bottom;
   substantially filling said container with a growing medium;
   planting a perennial starter plant in said growing medium in said container;
   placing said container in soil in a field with said open top substantially flush with said soil;
   for a period of time during said growing season, allowing said plant to grow in said container in said field, including allowing foliage to grow above said soil, a densely rooted basal plate to form within said container, and feeder roots to grow outwardly from the bottom of said container into soil below said container; and confining growth of said basal plate to said container throughout said period of time; and
   harvesting said plant during the dormant season by undercutting said feeder roots and removing said plant and said container as a unit from said field.

* * * * *